Patented Jan. 11, 1938

2,105,459

UNITED STATES PATENT OFFICE 2,105,459

HYDRATED TITANIUM-IRON ARSENATES AND METHOD OF MAKING SAME

Charles J. Kinzie and Eugene Wainer, Niagara Falls, N. Y., assignors to The Titanium Alloy Manufacturing Company, New York, N. Y., a corporation of Maine No Drawing. Application February 28, 1936, Serial No. 66,312

18 Claims. (Cl. 23—53)

Our invention relates to the production of arsenical compounds more particularly such as contain titanium and iron which are suitable for use as insecticides. An effective insecticide, as we believe, is one which is sufficiently stable not to decompose so fast as to burn the foliage of the plant to which it is applied, and yet is sufficiently unstable to break down when inside the organism of the insect.

In the methods described in the published literature relating to the production of titanium arsenate, the products formed were found to be unsuitable as insecticides and have certain defects in use. The soluble arsenic in the product must be very low since otherwise the product when used as an insecticide will be highly injurious to foliage; if the soluble arsenic is relatively high the plants may be killed. To avoid injury to vegetation the soluble arsenic in the insecticide should preferably be below ½ of 1%. Our novel titanium-iron arsenates contain practically no water-soluble arsenates and remain well-suspended in water; they are light and fluffy products and their titanium and iron contents are such as not to have any injurious effects on human beings.

Our novel hydrated-titanium-iron arsenates also possess the requisite high volume and also have an arsenic content higher than that of lead arsenate, and also possess great adherent properties necessary to enable them to stick to foliage and vegetation.

Where the teachings of prior art were followed with attempts to prepare titanium arsenate from titanium sulphate by complete neutralization with caustic alkalis, and then finishing up with neutral or alkaline solutions, the resultant titanium arsenates had an apparent specific gravity of 95 to 105 pounds per cu. ft. and also contained water-soluble $As_2O_5$ of about five percent; hence such products as made by hitherto known methods have proven entirely unfit for use.

After having first produced titanium-iron arsenates we found that when such products were made by complete neutralization with caustic alkalis, and finished in a neutral or alkaline solution, the resulting products had an apparent specific gravity of 130 to 140 pounds per cu. ft., and were therefore also unsuited for insecticidal purposes.

In addition, the known processes form titanium arsenates which are prohibitive in cost, due mainly to the fact that such known methods start with titanium salts that are relatively pure. Therefore as a prerequisite the known processes involve the elimination of iron and other impurities from ilmenite or rutile before the preparation of titanium arsenate is attempted.

Our invention, broadly stated, consists not only in the discovery of our new hydrated titanium-iron arsenates, but also in the discovery that by the novel procedures as fully described in the following examples, which comprises finishing in acid solutions, that products ranging from titanium-arsenate to titanium-iron arsenates all having the desired low weight per cu. ft. and low soluble $As_2O_5$ may be made, which products, we believe, are unknown up to the present time.

As the result of our researches and experiments in the preparation of suitable titanium arsenates, we have discovered that an arsenate of titanium and iron may be produced from titanium-iron solutions (obtained by dissolving ilmenite in sulphuric acid), and that these composite products are not only endowed with the desired physical characteristics such as great bulk, free flowing, low solubility particularly with reference to $As_2O_5$, and essential freedom from arsenites, etc., but also may be produced at a cost low enough to be within the permissible cost range for commercial insecticide usage.

The following examples will serve to show the nature of our new products and also our improved methods of making same.

Example A

The procedure we have successfully used is made up of three separate steps or stages, viz:

(1) The preparation of titanium-iron sulphate solution from ilmenite and $H_2SO_4$;

(2) The production of arsenite-free sodium arsenate from $As_2O_3$; and (3) The production of the novel titanium-iron arsenate hydrates by reaction of (1) and (2).

(1) Titanium-iron sulphate solution

Ilmenite of the chemical analysis given below was used in this example, but it should be understood that ilmenites vary over a wide composition range from those consisting mainly of ferrous titanate ($FeTiO_3$), to those in which rutile containing dissolved FeO and/or $Fe_2O_3$ in the rutile crystals predominate. The $TiO_2$ content may vary from 35 to 70 or more percent, and still come within the usable range. In fact, the requirement is that of a low cost titanium material which can be dissolved in sulphuric acid or mixtures of $H_2SO_4$ plus $Na_2SO_4$.

The ilmenite used in this Example A contained by analysis the following:

|  | Percent |
|---|---|
| TiO2 | 48 |
| FeO | 22 |
| Fe2O3 | 24 |
| SiO2 | 4 |
| Others | 2 |
|  | 100 |

Such ilmenite was first milled to fineness of about 5%+325 mesh. To 100 parts by weight of this milled ilmenite were added 300 parts by weight of $H_2SO_4$ (66° Bé.). The charge was mixed well and then heated to about 200° to 300° C. to form a titanium-iron sulphate mass which was then dissolved in water. The small amounts of insoluble silicates, etc., were settled out, and the solution was decanted and boiled with 500 cc. of $HNO_3$ (1.42 sp. gr.) to every 6.5 liters of the sulphate solution. This treatment converts all ferrous sulphate to ferric sulphate, and the boiling was continued one-half to one hour to remove excess $HNO_3$ and then cooled.

The amount $HNO_3$ used will be governed by the amount of ferrous sulphate, which of course will vary with the type of ilmenite and also the method of sulphate preparation, since there is usually some reduction of the ferric sulphate during this procedure. It is of the utmost importance to convert all ferrous sulphate to ferric sulphate before its use in the arsenate formation in stage (3) to be hereinafter described.

This oxidized sulphate solution was approximately of the following composition—

| Insoluble residue grams per liter | 0.10 |
|---|---|
| Percent TiO2 | 5.80 |
| Percent Fe2O3 | 5.70 |
| Total sulphur calculated as SO3 | 20.00 |
| Specific gravity | 1.45 |

Ratio TiO2 to Fe2O3 was 8:7.86.

(2) *Preparation of sodium arsenate solution*

The raw materials used were the following:

500 grams—white arsenic ($As_2O_3$)
350 c. c.—1.42 sp. gr. $HNO_3$ (nitric acid)
250 c. c.—1.19 sp. gr. HCl (hydrochloric acid)
600 grams—NaOH (sodium hydroxide)

The white arsenic ($As_2O_3$) was first dissolved in the nitric and hydrochloric acids and the clear solution was evaporated to incipient crystallization, and the oxidized arsenic mass was then cooled.

The sodium hydroxide (NaOH) was dissolved in water sufficient to form a 20 percent solution of NaOH and is then used to dissolve the oxidized arsenic mass (2.5 liters of NaOH that is added to the oxidized arsenate mass in 4.5 liters of water), which becomes the arsenite-free sodium arsenate solution ready for use in the preparation of the hydrated titanium-iron arsenate.

(3) *Preparation of hydrated titanium-iron arsenate*

Seven liters of the cold (15 to 30° C.) sodium arsenate solution are then added slowly to seven liters of the titanium-iron sulphate solution at room temperature with constant stirring. When the addition is completed, there is also added NaOH to the clear liquor in an amount sufficient to form an acidity between 0.50 and 1.00 percent upon dilution of the charge to the volume of 140 liters which is then produced by using cold water with stirring. It should be noted that the addition of alkali is resorted to only in cases where the acidity conditions require such addition, and the amount of alkali required as well as the necessity for the addition are governed by the degree of elimination of $HNO_3$ by boiling as well as the composition of the original solution. Precipitation of the titanium-iron arsenate occurs upon dilution, and the batch is left to digest at room temperature for about 24 hours with intermittent stirring, preferably at successive hourly periods.

The white voluminous precipitate is filtered off and is then washed with cold water to remove excess iron salts as well as soda salts and acid. The washed cake is then dried at about 115° C. The dried cake is crushed and rewashed with cold water to remove any soluble compounds formed in drying or which were possibly entrained in the voluminous precipitate and liberated during the first drying. The rewashed product is then dried and consists of a bulky white powder.

The weight of such product was 1708 grams out of a theoretical yield of 1847 grams.

Hence the yield was 92½ percent of theoretical, and the losses were mainly mechanical which would be largely avoided in any suitable commercial equipment.

This white product had an apparent specific gravity of 29.2 pounds per cu. ft.; therefore it is ideally adapted physically to cover a large surface in insecticidal usage.

The apparent specific gravity may be further modified, if desired, by any suitable disintegrating treatment.

This white product when analyzed, had approximately the following composition:

|  | Percent |
|---|---|
| As2O5 | 31.20 |
| TiO2 | 26.36 |
| Fe2O3 | 8.48 |
| Water soluble As2O5 | 0.16 |
| Water soluble TiO2 | Trace |
| Water soluble Fe2O3 | 0.07 |
| Reduced constituents | Nil |
| Acid insoluble constituents | Nil |
| H2O (difference) | 33.96 |
|  | 100.23 |

*Example B*

Like in Example A the process is made up of three separate steps or stages viz:

(1) The preparation of titanium-iron sulphate solution from ilmenite and $H_2SO_4$.

(2) The production of arsenite-free sodium arsenate from $As_2O_3$.

(3) The production of novel titanium-iron arsenates by reaction of (1) and (2).

(1) The ilmenite used in this example had a relatively low titanium but high iron content which analyzed as follows:

|  | Percent |
|---|---|
| TiO2 | 41 |
| FeO | 27 |
| Fe2O3 | 18 |
| SiO2 | 4 |
| MgO | 4 |
| Al2O3 | 4 |
| Others | 2 |
|  | 100 |

This ilmenite ore was first milled to fineness of about 5%+325 mesh. To 100 parts by weight of this milled ilmenite were added 200 parts by weight of $H_2SO_4$ (66° Bé.); the charge was mixed well and heated to about 200° C.–300° C. to form a titanium iron sulphate mass which was dissolved in water.

The small amounts of insoluble silicates, etc. were settled out, and the solution was filtered and boiled with 400 c. c. $HNO_3$ (sp. gr. 1.42) to every 6.5 liters of sulphate solution. This treatment acted to convert all the ferrous sulphate to ferric sulphate, and the boiling of the solution continued one-half to one hour to remove excess $HNO_3$ and was then cooled. The amount of $HNO_3$ used depends on the amount of reduced constituents which varies with different types of ilmenite.

This oxidized sulphate was approximately of the following composition—

| | | |
|---|---|---|
| Insoluble residue grams | per liter | Nil |
| $TiO_2$ | percent | 4.75 |
| $Fe_2O_3$ | do | 6.37 |
| Total sulphur calculated as $SO_3$ | do | 26.9 |
| Specific gravity | do | 1.44 |

(2) *Preparation of sodium arsenate solution*

The raw materials used were as follows:

400 grams—white arsenic ($As_2O_3$)
280 cc.—1.42 sp. gr. $HNO_3$ (nitric acid)
200 cc.—1.19 sp. gr. HCl (hydrochloric acid)
480 grams—NaOH (sodium hydroxide)

The white arsenic ($As_2O_3$) is first dissolved in nitric and hydrochloric acids, and the clear solution is evaporated to incipient crystallization and the oxidized arsenic mass was then cooled.

The sodium hydroxide (NaOH) is dissolved in 2 liters of water and is then used to dissolve the oxidized arsenic mass which has been suspended in 4 liters of water, which now becomes the arsenite-free sodium arsenate ready for use in the preparation of the hydrated titanium-iron arsenate.

(3) *Preparation of hydrated titanium-iron arsenate*

The 6 liters of cold (15–30° C.) sodium arsenate solution are added slowly with stirring to 7 liters of the oxidized titanium iron sulphate solution at room temperature with constant stirring. When the addition is completed, there are added to the clear liquor 650 grams of NaOH dissolved in 1500 cc. of water, and the solution is stirred until the precipitate has dissolved. The charge is now diluted with cold water to 140 liters with stirring. Precipitation of the titanium-iron arsenate occurs upon dilution, and the batch is left to digest at room temperature for 24 hours, but the batch is stirred well every hour.

The white voluminous precipitate is filtered off and washed with cold water to remove excess iron salts as well as soda salts and acid, and the washed cake is dried at 90° C. The dried cake is crushed and rewashed with cold water to remove any soluble compounds formed in drying, or which were possibly entrained in the voluminous precipitate and liberated during first drying. The rewashed product was then dried at 110° C. and consisted of a bulky cream-white product of apparent specific gravity of 28.8 pounds per cu. ft.

The weight of such product was 1317 grams out of a theoretical yield of 1390 grams. The yield was, therefore, 95% of theoretical.

Such bulky cream-white product, when analyzed, had approximately the following composition.

| | |
|---|---|
| $As_2O_5$ | 36.4% |
| $TiO_2$ | 34.8% |
| $Fe_2O_3$ | 11.2% |
| Water soluble $As_2O_5$ | Nil to trace |
| Water soluble $Fe_2O_3$ | Trace<0.1% |
| Water soluble $TiO_2$ | Trace<0.1% |
| Reduced constituents | Nil |
| Acid insoluble constituents | Nil |
| $H_2O$ (difference) | 17.6% |
| | 100.2% |

*Example C*

Like in preceding examples the process is made up of three separate steps or stages, viz:

(1) The preparation of titanium-iron sulphate solution from ilmenite and $H_2SO_4$.
(2) The production of arsenite-free sodium arsenate from $As_2O_3$.
(3) The production of novel titanium-iron arsenates by reactions of one and two.

(1) The ilmenite used in this Example C was somewhat higher in titanium and lower in iron as compared with the ilmenite used in Example A, and contained:

| | Percent |
|---|---|
| $TiO_2$ | 61.8 |
| FeO | 9.7 |
| $Fe_2O_3$ | 22.5 |
| MgO | 1.0 |
| $SiO_2$ | 4.0 |
| Others | 1.0 |
| | 100.0 |

This ilmenite ore was first milled to a fineness of about 5%+325 mesh. To 100 parts by weight of this ilmenite were added 25 parts by weight (66° Bé.) $H_2SO_4$; this charge was well mixed, and heated to 200–300° C. to form a titanium iron sulphate mass which was dissolved in water. The small amounts of insoluble silicates, etc., were settled out, and the solution was filtered and boiled with 200 cc. of $HNO_3$ (sp. gr. 1.42) to every 6.5 liters of sulphate solution. This treatment converted all the ferrous sulphate to ferric sulphate, and the boiling was continued one half to one hour to remove excess $HNO_3$ and was then cooled.

This oxidized sulphate solution was approximately of the following composition:—

| | | |
|---|---|---|
| Insoluble residue grams | per liter | 0.10 |
| $TiO_2$ | percent | 8.08 |
| $Fe_2O$ | do | 5.45 |
| Total sulphur calculated as $SO_3$ | do | 24.5 |
| Sp. gravity | | 1.45 |

(2) *Preparation of sodium arsenate solution*

The raw materials used were as follows:

632 grams—white arsenic ($As_2O_3$)
442 cc.—1.42 sp. gr. $HNO_3$ (nitric acid)
316 cc.—1.19 sp. gr. HCl (hydrochloric acid)
760 grams—NaOH (sodium hydroxide)

The white arsenic ($As_2O_3$) is first dissolved in nitric and hydrochloric acids, and the clear solution is evaporated to incipient crystallization and the oxidized arsenic mass was then cooled.

The sodium hydroxide (NaOH) is dissolved in 3 liters of water and used to dissolve the oxidized arsenic mass which is suspended in 5 liters of water, which solution now becomes the arsenite-free sodium arsenate ready for use in the preparation of the hydrated titanium-iron arsenate.

(3) Preparation of hydrated titanium-iron arsente

The 8 liters of cold (15–30° C.) sodium arsenate solution are added slowly with stirring to 7 liters of this oxidized titanium-iron solution at room temperature with constant stirring. When this addition is completed, there are added to the clear liquor 350 grams of NaOH dissolved in 1000 cc. of water, and the solution is stirred until the precipitate has dissolved. The charge is now diluted with cold water to 140 liters with stirring. Precipitation of the titanium-iron arsenate occurs on dilution, and the batch is left to digest at room temperature for 24 hours; the batch is well stirred every hour.

The white voluminous precipitate is filtered off and washed with cold water and then dried at 90° C. The dried cake is crushed and rewashed with cold water to remove the soluble compounds formed in drying, or which were possibly entrained in the voluminous precipitate and liberated during first drying.

The rewashed product is then dried at 110° C. and consisted of a bulky cream-white product of apparent specific gravity of 31.6 pounds per cu. ft.

The weight of product was 2170 grams out of a theoretical yield of 2208 grams so that the yield equals 98.2% of theoretical.

This bulky cream white product, when analyzed, had approximately the following composition.

| | |
|---|---|
| $As_2O_5$ | 36.0% |
| $TiO_2$ | 35.4% |
| $Fe_2O_3$ | 7.6% |
| Water soluble $As_2O_5$ | Nil to trace |
| Water soluble $TiO_2$ | Trace <0.1% |
| Water soluble $Fe_2O_3$ | Trace <0.1% |
| Reduced constituents | Nil |
| Acid insoluble constituents | Nil |
| $H_2O$ (difference) | 21.0% |
| | 100.2% |

In the foregoing examples, Example A sets forth our preferred procedure resulting in the preferred compound, but we have also produced other hydrated titanium-iron arsenates suitable for use as insecticides. We have also explored the field of titanium-iron sulphate solutions containing a lower iron content, but treated according to the detailed procedure set forth in Example A.

In order to simplify presentation the data is given in the following condensed table form

| Example | Ratio $TiO_2$ to $Fe_2O_3$ in sulphate sol. used | Composition and characteristics of products produced ||||
|---|---|---|---|---|---|
| | | Percent $Fe_2O_3$ | Percent $TiO_2$ | Percent $As_2O_5$ | Pounds per cu. ft. |
| D | 8:6 | 8.1 | 31.9 | 32.4 | 32 |
| E | 8:4 | 7.6 | 33.7 | 34. | 30 |
| F | 8:2 | 6.6 | 34.8 | 35.1 | 32 |
| G | 8:1 | 4.2 | 35.7 | 35.6 | 29 |

Examples D to G inclusive show the use of solutions having a wide ratio range of titanium to iron, and such varied solutions may be used when made either from ilmenite ores or from mixing titanium sulphate and iron sulphates.

Examples A to G inclusive show that the titanium-iron sulphate solutions may vary over a wide range in respect to the ratio of titanium to iron without greatly affecting the composition of the products formed by the methods of Example A, such products retaining the desirable characteristics of low apparent specific gravity (weight per cu. ft.), low soluble $As_2O_5$, as well as sufficient total $As_2O_5$.

All the products of Examples A to G inclusive were practically free of water-soluble arsenic and other water-soluble compounds.

Other experiments in which the amount of the sodium arsenate was progressively increased with the titanium-iron sulphate of Example A remaining constant, produced products in which the iron progressively increased to a maximum of 19 percent, while the $TiO_2$ decreased to a minimum of 22 percent, with the $As_2O_5$ increasing to a maximum of 38 percent.

As the amount of sodium arsenate increased, the arsenic loss in the washings also increased; also the soluble arsenic in finished products increased, both of which are features to be avoided. Therefore we prefer to keep within the range of Examples A to G.

It should also be observed that water of hydration may be partially lost upon longer drying or at higher temperatures; hence the practical aim is to produce a fluffy low apparent specific gravity product by suitable drying control in respect to time and temperatures.

Optical and other properties disclosed under petrographic microscope

The product of Example A, when examined and studied, is composed almost entirely of an isotropic (probably amorphous) material having a refractive index very slightly less than 1.738 and probably about 1.732 to 1.735. There are small amounts of minute inclusions of $TiO_2$, and a small amount of admixture of an hydrated iron oxide. Both impurities, however, are in very small amounts. The primary constituent seems to be uniform in composition as indicated by a uniform appearance and refractive index. The fracture is conchoidal. The particle sizes vary very much and range from pieces a little over a micron in size up to material which is probably coarser than 325 mesh. There is no apparent crystal structure of any kind in the primary material.

This product also has slow settling speed in water, that is to say, it remains dispersed in water over long periods of time. The dried powder sticks tenaciously to moist surfaces.

From the foregoing description it should be noted that both the titanium and iron contents in our novel hydrated titanium-iron arsenate add to the stability of our products and their light fluffy nature as well as adherent properties enable same to be exceptionally useful as effective insecticides that are safe for foliage; furthermore when compared with lead arsenates, our products do not have the injurious effects that lead has on the human system. The fact that our hydrated titanium-iron arsenates contain practically no water-soluble arsenates and remain in suspension in water for long periods renders them highly efficient as insecticides.

We claim as our invention:

1. A method of making a hydrated titanium-iron arsenate which comprises bringing together an oxidized titanium-iron sulphate solution and an arsenite-free sodium arsenate solution, allowing the reaction to proceed to formation of a precipitate, separating the latter from the solution, washing the precipitate to remove impurities, and finally drying the resulting hydrated titanium-iron arsenate.

2. A method of making a hydrated titanium-iron arsenate which comprises bringing together a titanium-iron sulphate solution free from ferrous sulphate and a sodium arsenate solution, allowing the reaction to proceed to formation of a precipitate, separating the latter from the solution, washing the precipitate to remove impurities, and finally drying the resulting hydrated titanium-iron arsenate.

3. A method of making a hydrated titanium-iron arsenate which comprises dissolving arsenic trioxide in acids to form a clear solution, evaporating same to incipient crystallization, then dissolving the resulting oxidized arsenate mass with a solution of sodium hydroxide to form an arsenite-free sodium arsenate solution, bringing together the latter solution and an oxidized titanium-iron sulphate solution and allowing the reaction to proceed to formation of a precipitate, washing the precipitate to remove impurities, drying the resulting hydrated titanium-iron arsenate, and finally rewashing same to remove any soluble compounds therefrom.

4. A method of making a hydrated titanium-iron arsenate which comprises dissolving arsenic trioxide in acids to form a clear solution, evaporating same to incipient crystallization, then dissolving the resulting oxidized arsenate mass with a solution of sodium hydroxide to form a sodium arsenate solution, bring together the latter solution and a titanium-iron sulphate solution free from ferrous sulphate and allowing the reaction to proceed to formation of a precipitate, washing the precipitate to remove impurities, and finally drying the resulting hydrated titanium-iron arsenate.

5. In the method of making a hydrated titanium-iron arsenate from a titanium-iron sulphate solution free from ferrous sulphate, the step which consists in bringing together in reactive relation said solution and a sodium arsenate solution and allowing the reaction to proceed with recovery therefrom of the precipitated hydrated titanium-iron arsenate.

6. In the method of making a hydrated titanium-iron arsenate from a titanium-iron sulphate solution free from ferrous sulphate, the step which consists in bringing together in reactive relation said solution and an arsenite-free sodium arsenate solution and allowing the reaction to proceed with recovery therefrom of the precipitated hydrated titanium-iron arsenate.

7. In the method of making a hydrated titanium-iron arsenate from an oxidized titanium-iron sulphate solution, the steps which consist in preparing from arsenic trioxide a sodium arsenate solution by dissolving an oxidized arsenate mass formed from the arsenic trioxide in a sodium hydroxide solution to form said sodium arsenate solution and then bringing said arsenate solution in reactive relation with said titanium-iron sulphate solution.

8. In the method of making a hydrated titanium-iron arsenate from a titanium-iron sulphate solution free from ferrous sulphate, the steps which consist in preparing from arsenic trioxide a sodium arsenate solution by dissolving an oxidized arsenate mass formed from the arsenic trioxide in a substantially 20% sodium hydroxide solution to form said sodium arsenate solution and then bringing said arsenate solution in reactive relation with said titanium-iron sulphate solution.

9. In the method of making a hydrated titanium-iron arsenate from an oxidized titanium-iron sulphate solution, the steps which consist in dissolving arsenic trioxide in acids with evaporation to form an oxidized arsenate mass, and dissolving the latter in an arsenite-free sodium hydroxide solution to form a sodium arsenate solution, and finally mixing the latter with said titanium-iron sulphate solution with precipitation during the reaction in acid solution of the hydrated titanium-iron arsenate.

10. In the method of making a hydrated titanium-iron arsenate from a titanium-iron sulphate solution free from ferrous sulphate, the steps which consist in dissolving arsenic trioxide in acids with evaporation to form an oxidized arsenate mass, and dissolving the latter in a substantially 20% sodium hydroxide solution to form a sodium arsenate solution, and finally mixing the latter with said titanium-iron sulphate solution with precipitation during the reaction in acid solution of the hydrated titanium-iron arsenate.

11. In the method of making a hydrated titanium-iron arsenate from a sodium arsenate solution, the step which consists in mixing with said solution an oxidized titanium-iron salt solution free from ferrous sulphate with precipitation during the reaction of the hydrated titanium-iron arsenate.

12. As a new composition of matter, a hydrated titanium-iron arsenate essentially free from water-soluble arsenical compounds.

13. A hydrated titanium-iron arsenate characterized as being a free-flowing, pulverulent material of high bulking value and essentially free from water-soluble arsenical compounds.

14. A hydrated titanium-iron arsenate characterized as being a free-flowing, pulverulent material of high bulking value, essentially free from water-soluble arsenical compounds, and being stable in aqueous dispersion.

15. A hydrated titanium-iron arsenate in which the arsenic constituents are slightly in excess of the titanium constituents with the iron constituents substantially less than the arsenic or titanium, and characterized as being essentially free from water-soluble compounds.

16. A hydrated titanium-iron arsenate essentially free from water-soluble arsenical compounds in which the arsenic constituents range from about 32 to 37%; the titanium constituents from about 31 to 36%; the iron constituents from about 4% to about 11%; with the remainder substantially water of hydration.

17. A hydrated titanium-iron arsenate in which the arsenic constituents range from about 32 to 37%; the titanium constituents from about 31 to 36%; the iron constituents from about 4% to about 11%; with the remainder substantially water of hydration; and characterized as having high bulking value and as being essentially free from water-soluble compounds.

18. An insecticidal composition containing as the active insecticidal ingredient hydrated titanium-iron arsenate essentially free from water-soluble arsenical compounds.

CHARLES J. KINZIE.
EUGENE WAINER.